Aug. 24, 1943.   J. O. SHERMAN ET AL   2,327,377
PAPER FEEDING MECHANISM
Filed June 5, 1939    11 Sheets-Sheet 4
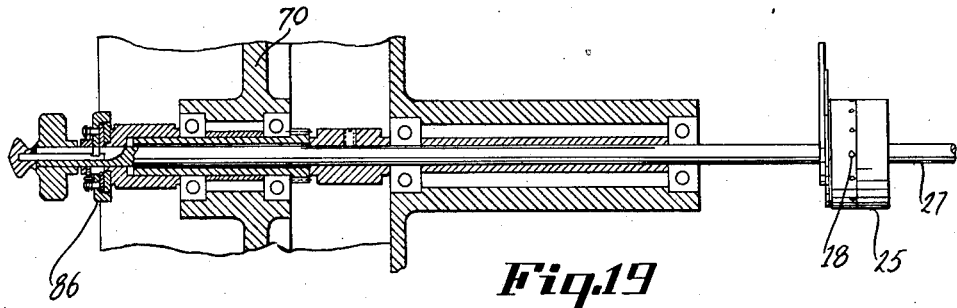
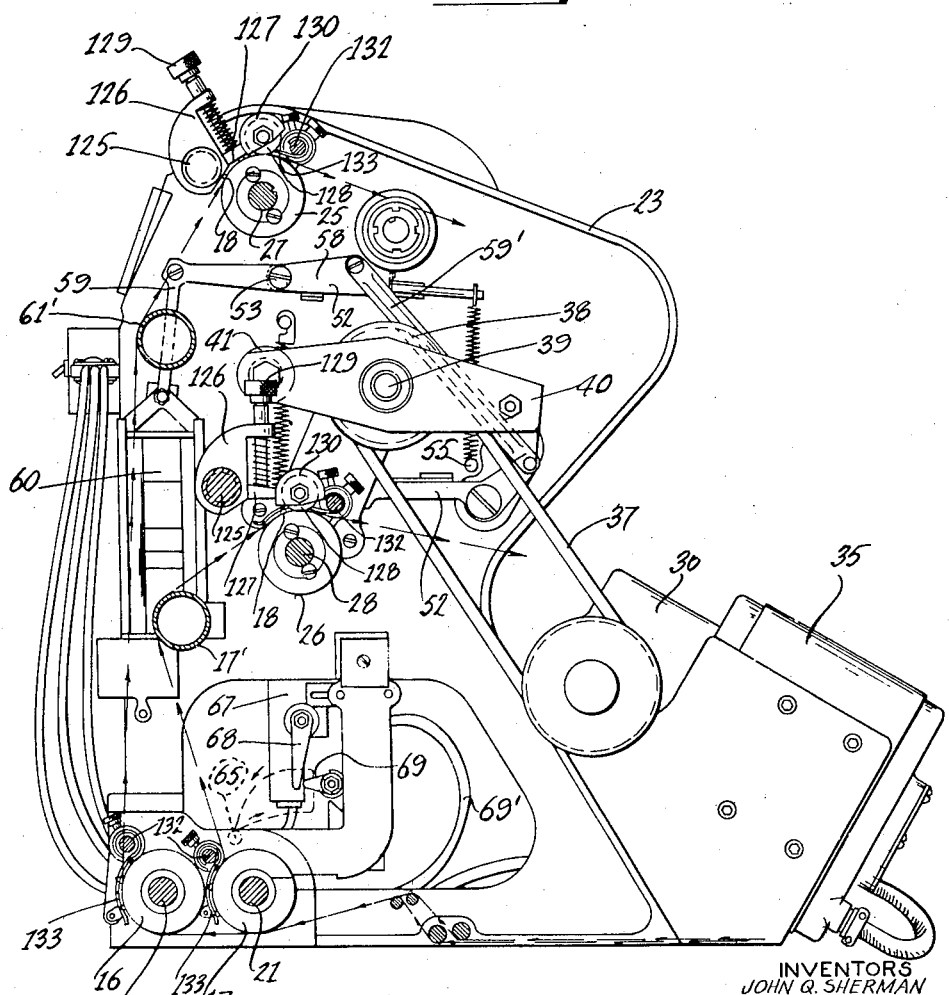

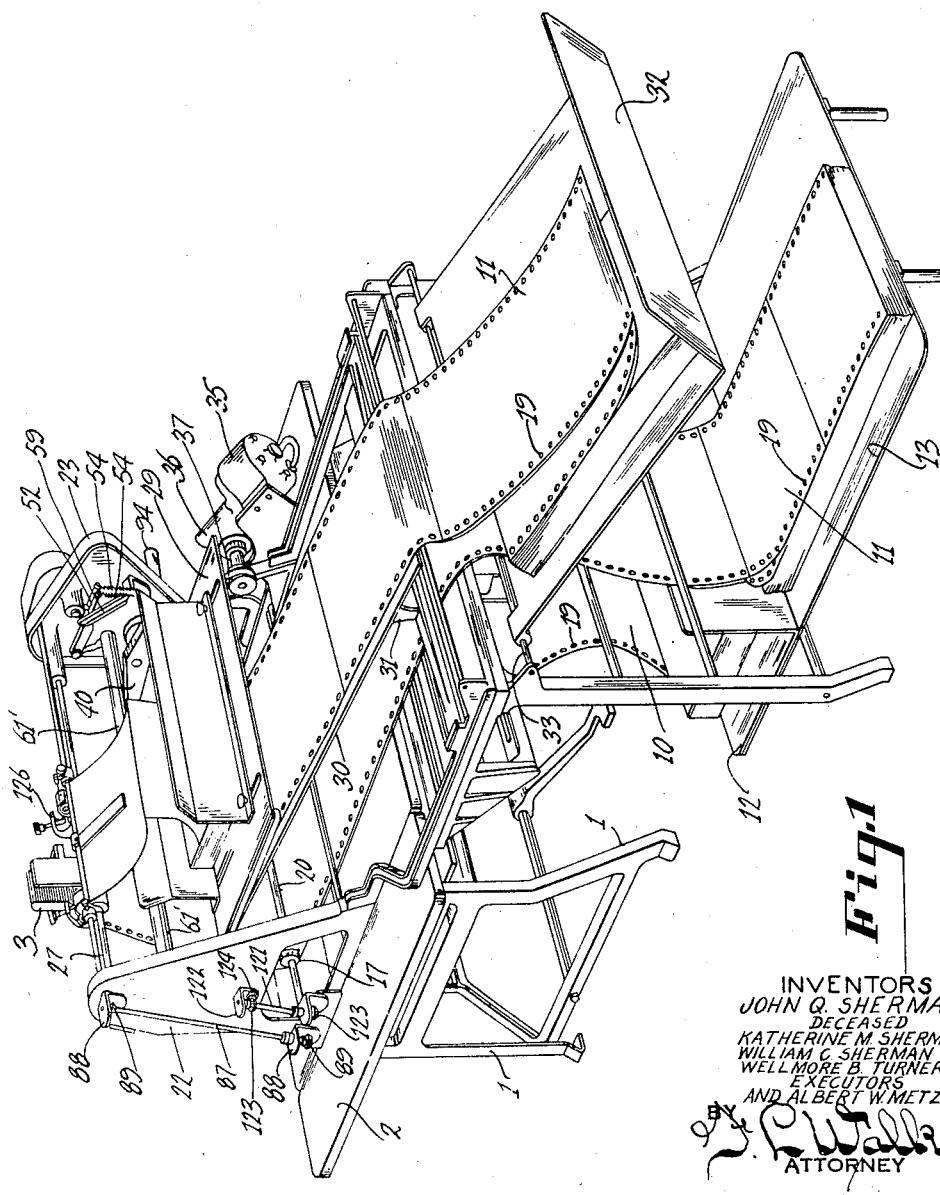

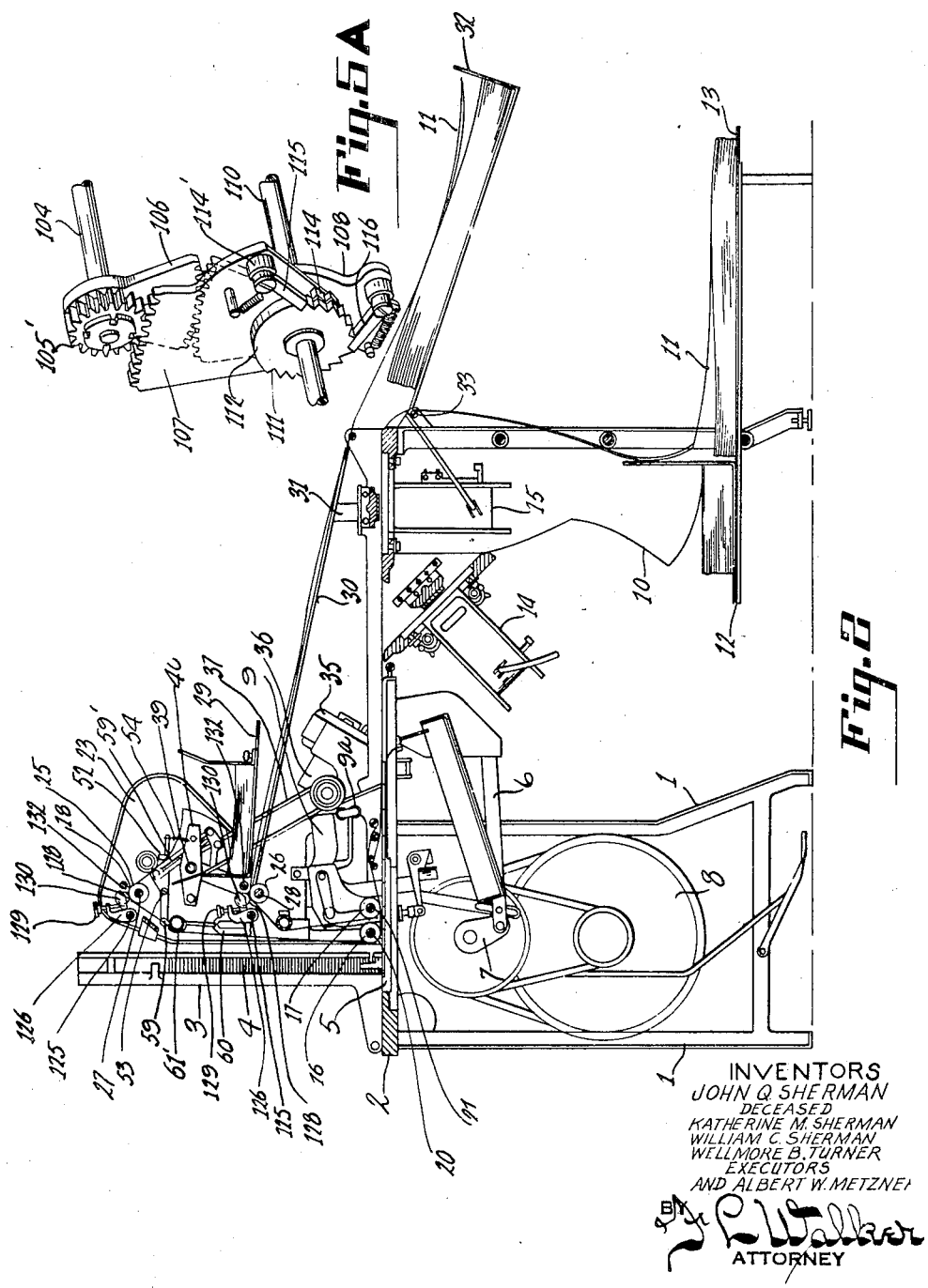

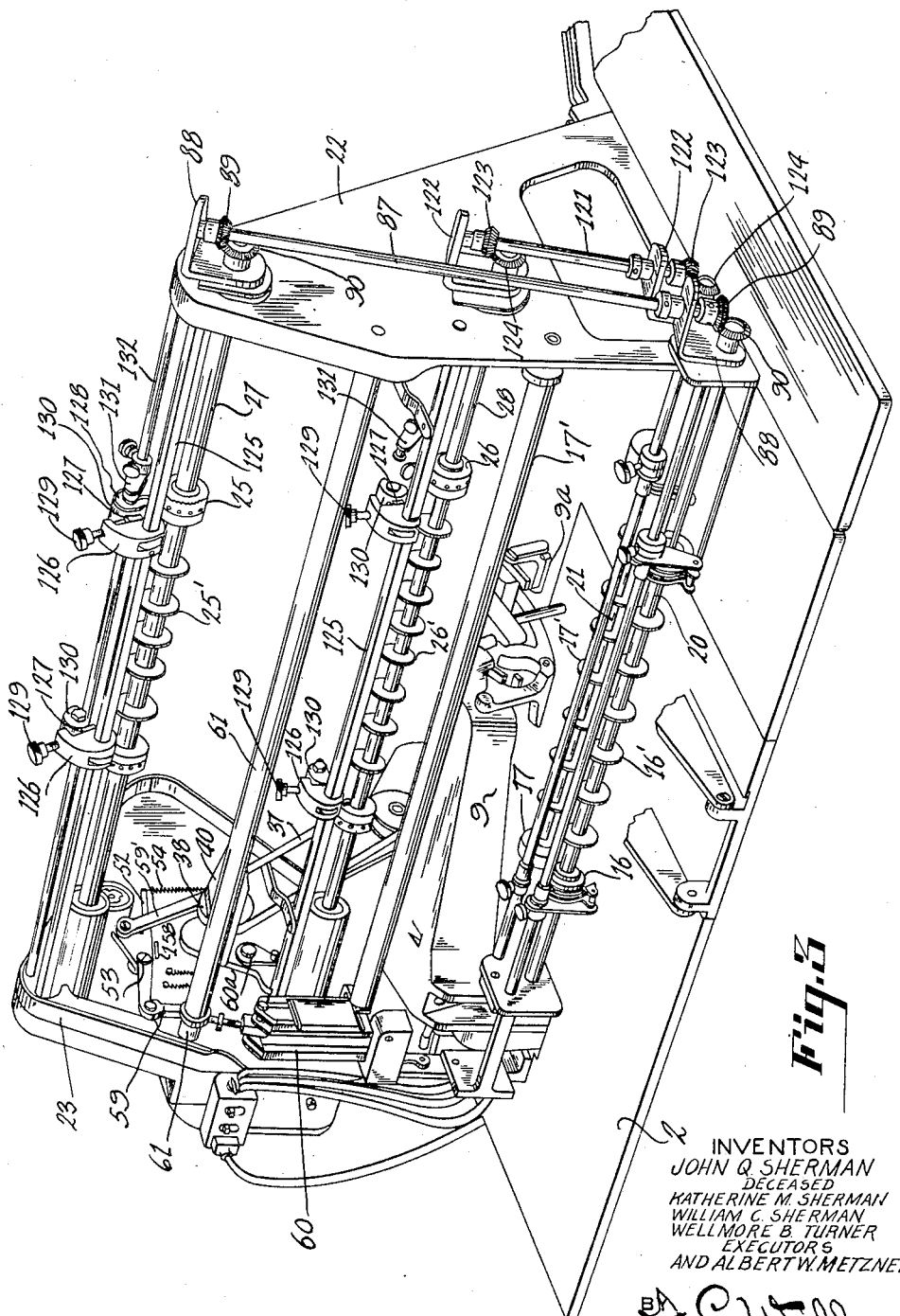

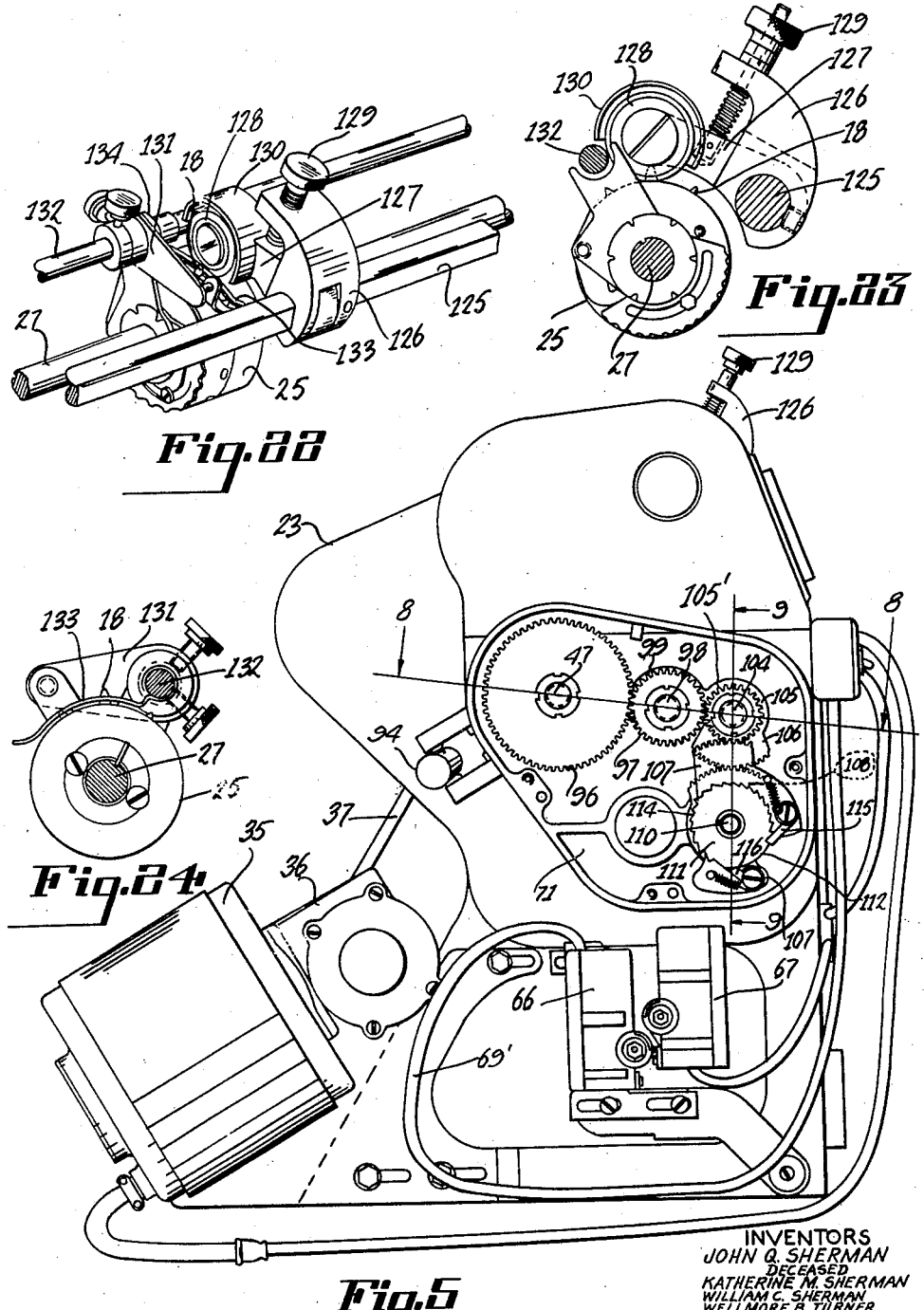

Aug. 24, 1943.     J. O. SHERMAN ET AL     2,327,377
PAPER FEEDING MECHANISM
Filed June 5, 1939      11 Sheets-Sheet 6

INVENTORS
JOHN Q. SHERMAN
DECEASED
KATHERINE M. SHERMAN
WILLIAM C. SHERMAN
WELLMORE B. TURNER
EXECUTORS
AND ALBERT W. METZNER
BY
ATTORNEY

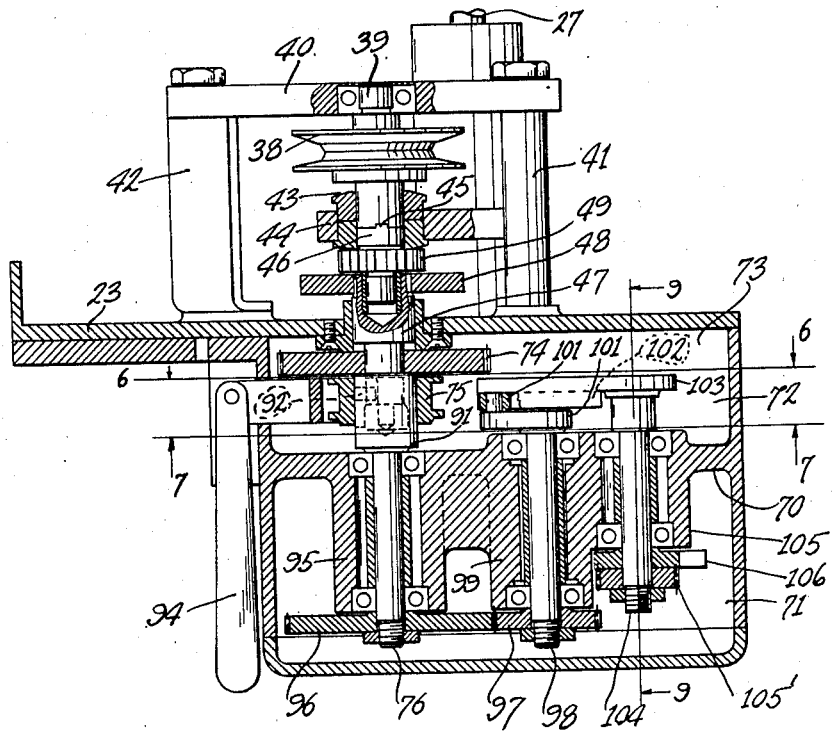

Aug. 24, 1943.　　J. O. SHERMAN ET AL　　2,327,377
PAPER FEEDING MECHANISM
Filed June 5, 1939　　11 Sheets-Sheet 8
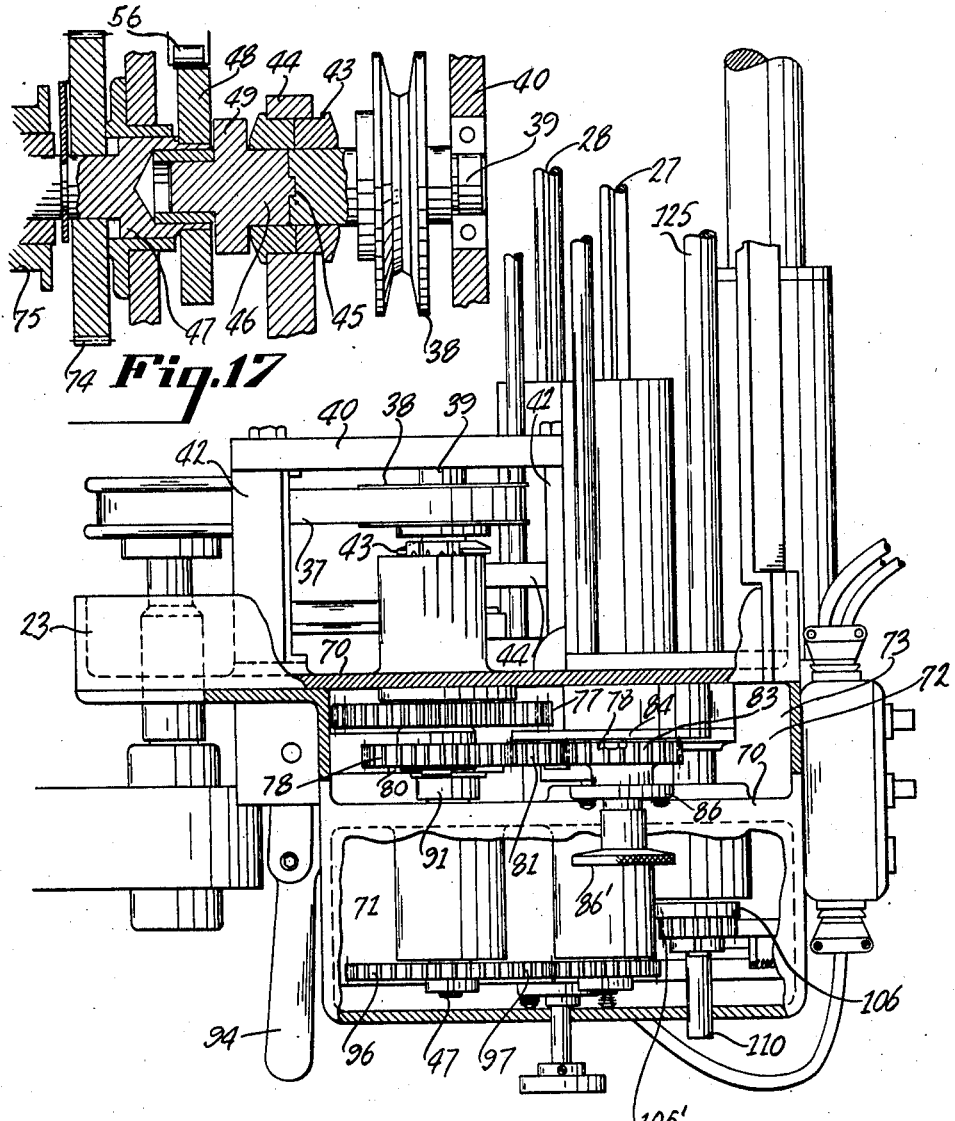
INVENTORS
JOHN Q. SHERMAN
DECEASED
KATHERINE M. SHERMAN
WILLIAM C. SHERMAN
WELLMORE B. TURNER
EXECUTORS
AND ALBERT W. METZNER
ATTORNEY

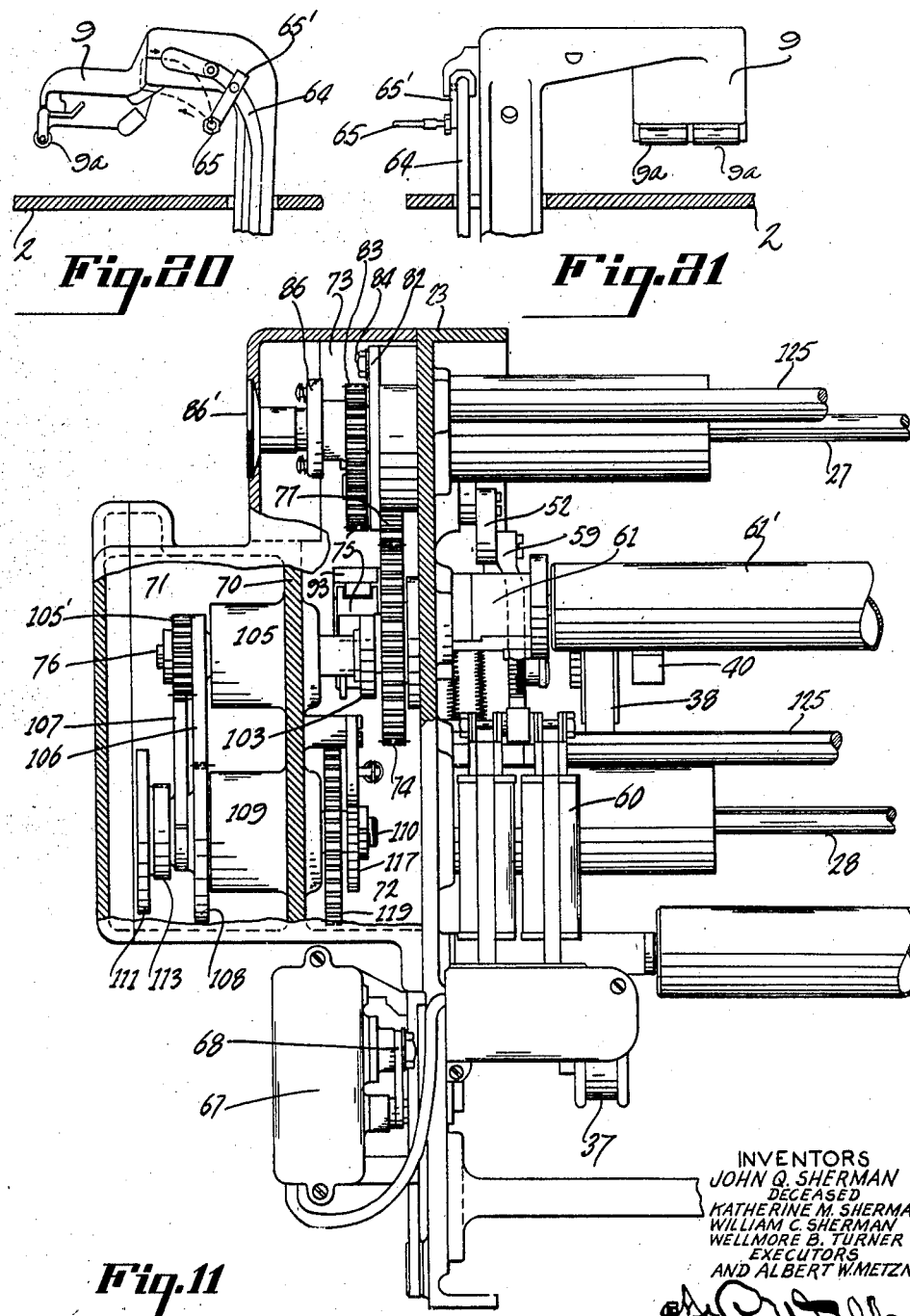

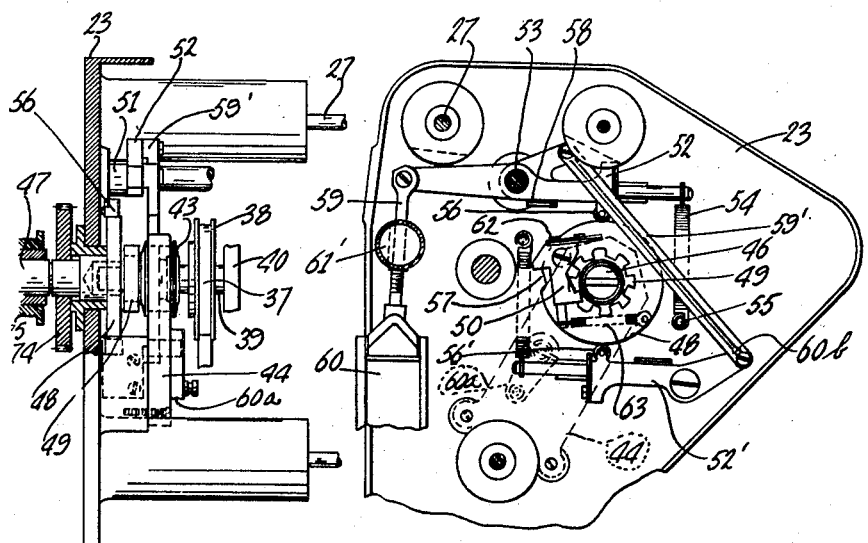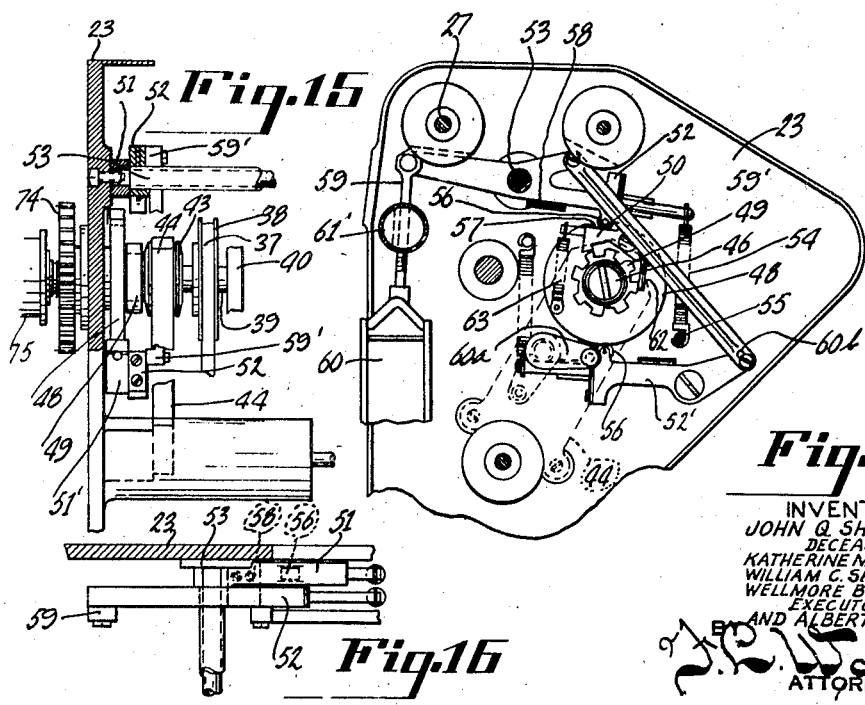

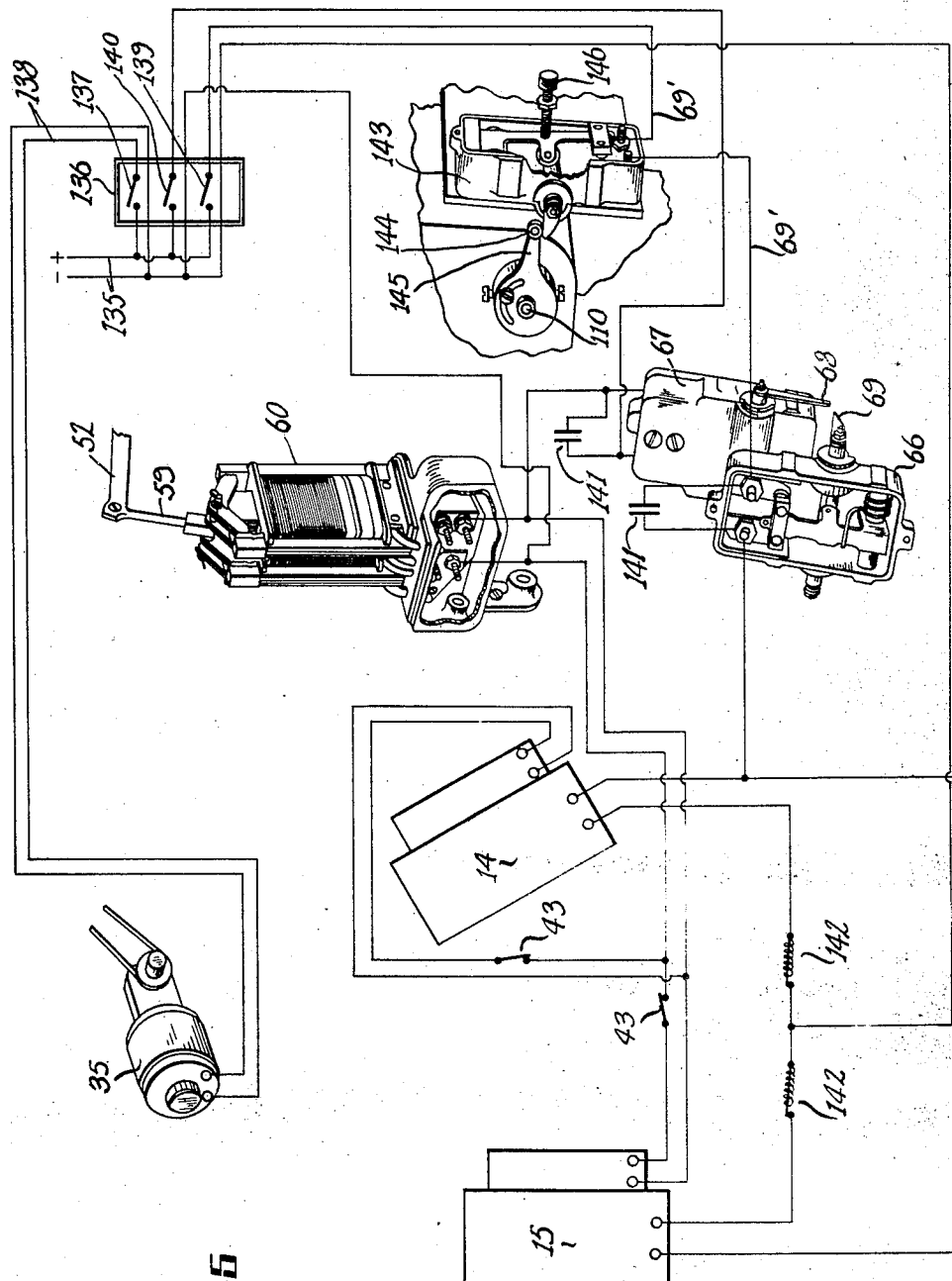

Patented Aug. 24, 1943

2,327,377

UNITED STATES PATENT OFFICE 2,327,377

PAPER FEEDING MECHANISM

John Q. Sherman and Albert W. Metzner, Dayton, Ohio; said Metzner assignor to said Sherman; Katherine M. Sherman, William C. Sherman, and Wellmore B. Turner, executors of said John Q. Sherman, deceased Application June 5, 1939, Serial No. 277,484

10 Claims. (Cl. 101—47)

This invention pertains to imprinting machines for producing successive impressions at longitudinally spaced intervals upon continuous strips of stationery, and more particularly the cooperative association therewith of dual aligning and registering feeding mechanism for periodically positively advancing superposed strips of record material through simultaneous step by step movements of different extent in timed relation past an impression receiving position to effect accurate registry of differently spaced areas upon different strips in imprinting position and preferably, but not necessarily, includes traveling pin type feeding devices engageable in longitudinally spaced holes in the superposed record strips and actuated in synchronism with the operation of the imprinting apparatus.

While the present dual strip feeding and aligning mechanism is applicable to a wide range of different writing and imprinting machines wherein continuous strip stationery is intermittently advanced past an impression receiving position, in synchronized relation with which the feeding and aligning mechanism is automatically actuated, including various forms of printing and recording apparatus, computing, tabulating and billing machines, typewriters and the like, for illustrative purpose, but with no intent to unduly limit the scope or application of the invention, it is herein shown and described as incorporated with a conventional form of addressing machine.

The present construction is a further development and amplification of the inventions disclosed in copending applications Serial No. 683,612, filed August 4, 1933 now matured into Letters Patent No. 2,095,292, Serial No. 106,158, filed October 17, 1936, now matured into Letters Patent No. 2,200,308, and Serial No. 157,706, filed August 6, 1937 now matured into Letters Patent No. 2,160,916 and is a continuation in part thereof.

However, in lieu of advancing the continuous strip stationery downwardly from a supply in elevated relation above the imprinting devices and thence forwardly past the imprinting position and over the table to the front of the machine where it is engaged by the pin type feeding means as illustrated in the prior constructions, in the present instance the pin type feeding devices are located in juxtaposition to the imprinting devices and the supply of record material is drawn in reverse direction from the supply packet at the front of the machine rearwardly past the impression receiving position and is then elevated upwardly to an elevated receiver or guide means for the imprinted material.

It has been found that by so locating the feeding units in close relation with the imprinting position, much greater accuracy is assured, since there is not the opportunity for accumulation of error between the feeding and imprinting points.

Different superposed strips are operatively engaged by separate pin type feeding devices which are actuated simultaneously but through different feeding ranges, so that while one strip is advanced a full form length at each operation a companion strip may be advanced only a line space or a lesser or greater distance than the first strip, as may be necessary to present successive differently spaced prescribed areas of the respective strips in exact registry with each other exactly at the imprinting position.

The factor of exact registry is quite important and necessary for accurate manifolding operations. Frictional feed devices have been employed for advancing continuous stationery, but always there is present an element of slippage and creep of one strip relative to the other which introduces error of registry. While the differential feed may be almost infinitesimal in a single form length, it is cumulative and after feeding some hundreds or thousands of forms, the error or degree of offset grows to such extent that the prescribed area of the original record strip may not be presented in proper impression receiving relation, and the manifolded record may be offset both from the printing position and out of registry with the imprint receiving areas of the original record strip. The present positive pin type feeding mechanism is designed and timed to present succeeding differently spaced areas of the original record and duplicate record strips in proper aligned and registering relation with each other simultaneously in accurate registry with impression devices at each operation.

The present registering and aligning mechanism is applicable to existing imprinting machines, and is readily adjustable for feeding strips of various widths different distances to accommodate forms of different lengths or stationery having different line spacing, or whereon the prescribed impression receiving areas are differently spaced.

The object of the invention is to simplify the construction as well as the means and mode of operation of registering and aligning mechanisms applied to imprinting machines, whereby they may not only be economically constructed, but will be more efficient in use, automatic in action, uniform in operation, of extreme accuracy, and unlikely to get out of repair.

A further object of the invention is to provide dual feeding means for simultaneously advancing separate superposed strips different distances and presenting successive differently spaced prescribed areas thereof accurately in registry with each other and simultaneously in registry with the imprinting devices.

A further object of the invention is to provide means for effecting the differential feeding movement of superposed strips in synchronism with the operation of the imprinting machine and under the direct control thereof, whereby the imprinting and feeding operation will be successively effected in a continuous cycle.

A further object of the invention is to provide means for varying the range of differential feeding movement of one or the other of the strips relative to each other and to the imprinting position, to effect accurate registry.

A further object of the invention is to provide dual registering and aligning mechanisms applicable to different forms of imprinting apparatus having the herein disclosed advantageous structural features and meritorious characteristics.

An important object is to provide multiple feeding and aligning devices for differentially advancing superposed impression receiving strips by feeding one strip or set of strips through an operative cycle including steps of different extent while simultaneously advancing another strip or set of strips through a succession of movements of uniform extent.

A further important object is to provide strip elevating means by which the imprinted strips are elevated in synchronism with the imprinting operation and distributed at different levels to receiving compartments.

With the above primary and other incidental objects in view as will more fully appear in the specification, the invention consists of the features of construction, the parts and combinations thereof, and the mode of operation, or their equivalents as hereinafter described and set forth in the claims.

In the accompanying drawings, wherein is shown the preferred but obviously not necessarily the only form of embodiment of the invention, Fig. 1 is a perspective view of a conventional type of addressing machine to which the present invention has been applied, viewed from the front and illustrating the paths of travel of the continuous strip stationery from the supply packets to the receivers for the imprinted material.

Fig. 2 is a vertical sectional view illustrating sundry operating parts of the addressing machine and their relation to the differential aligning and registering feed mechanism for superposed strips.

Fig. 3 is a perspective view of the super-structure viewed from the rear.

Fig. 4 is a vertical sectional view of the superstructure on an enlarged scale of the parts shown in Fig. 2 looking toward the inner right side of Fig. 1.

Fig. 5 is a side elevation viewed from the outer right side of the super-structure opposite that shown in Fig. 4, illustrating a portion of the driving train.

Fig. 5a is a detail perspective view thereof.

Figure 6:
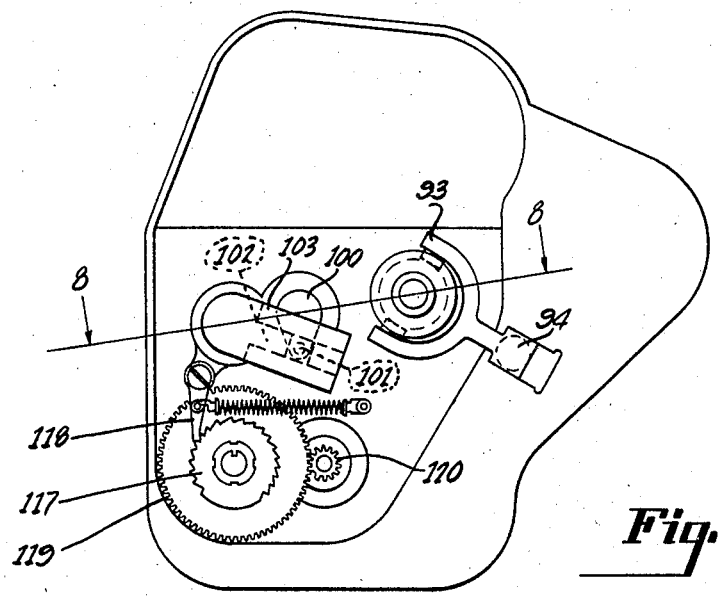
Figure 7:
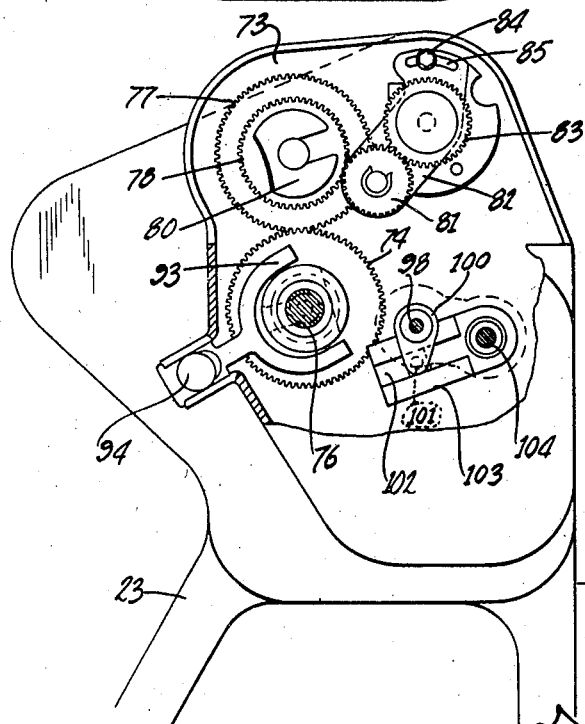

Figs. 6 and 7 are detail elevations viewed from the inner side and outside respectively of the righthand side of the frame of the super-structure, the views being in the planes 6—6 and 7—7 of Fig. 3 viewed in opposite directions, illustrating continuations of the driving train supplemental to that shown in Fig. 5.

Fig. 8 is a horizontal sectional plan view on line 8—8 of Fig. 5.

Fig. 9 is a vertical sectional view on line 9—9 of Fig. 5 and Fig. 8.

Fig. 10 is a top plan view of the gear transmission mechanism shown in Figs. 5, 6, 7, 8 and 9 with the gear housing broken away.

Fig. 11 is a rear elevation of the transmission mechanism shown in plan in Fig. 10 with the gear housing broken away.

Figs. 12 and 13 are detail elevations from the inner side of the right-hand frame of the superstructure showing the one cycle control or timing mechanism, also shown in Fig. 4, in its engaged driving condition and in normal inactive condition respectively.

Figs. 14 and 15 are detail side elevations from the left of Figs. 12 and 13.

Fig. 16 is a detail top plan view of the mechanism shown in Figs. 12 to 15.

Fig. 17 is a detail sectional view through the driving connections.

Fig. 18 is a detail view of the clutch mechanism for connecting and disconnecting the second set of pin type feeding and elevating devices.

Fig. 19 is a detail sectional view of the mounting for one of the driven shafts.

Figs. 20 and 21 are respectively side and rear detail elevations of the presser head and associated roller actuating bar by which the numbering and feeding mechanisms are tripped in timed sequence with the operation of the imprinting devices.

Fig. 22 is a perspective view of the strip guiding and shearing means by which the punched margins are severed from the strips.

Fig. 23 is a side elevation of the strip shearing means.

Fig. 24 is a detail view thereof.

Fig. 25 is a diagrammatic view of the electrical energizing system.

Like parts are indicated by similar characters of reference throughout the several views.

While the present invention is herein illustrated as embodied in a conventional form of addressing machine, it is to be understood that it is not so limited, but may be readily adapted for use in conjunction with other forms of imprinting apparatus, including tabulating, billing and check writing machines, typewriters and other analogous mechanisms wherein it may be advantageous or desirable to differentially feed superposed strips of continuous series connected form stationery and imprint thereon simultaneously at different spaced intervals of the respective strips.

The imprinting apparatus illustrated, and commercially known as an "Addressograph," comprises a stand or legs 1 supporting a table 2, from which projects a vertical magazine 3 containing a stack of legend determining elements 4, which may be preformed printing plates or stencils. In the usual commercial tabulating machines with which the present registering and aligning feeding mechanism also may be utilized, such legend determining elements ordinarily comprise punched cards consecutively fed from a supply thereof and which control the setting of the imprinting type elements, preparatory to imprinting the legend determined thereby.

In the present "Addressograph" machine, the legend determining elements 4 are consecutively fed by a reciprocatory slide 5, automatically actuated in properly timed sequence by a connecting rod 6 and crank 7, motor actuated through a pulley and belt speed reduction train 8, all located beneath the table 2. The printing plates 4 are advanced singly from the magazine and consecutively presented in imprinting position beneath the depressible pressure head 9 and in impression imparting relation with successive portions of continuous superposed strips of record material 10 and 11.

The present embodiment of the invention is designed for imprinting upon a succession of series connected checks or other forms, consecutive identifying numbers or other indicia and the name, address, account number, or other personal data, and to simultaneously imprint upon a master or detail sheet the same check or form number and the same data. To this end the record strips 10 and 11, which may be the same or different widths, as desired, are advanced from supply compartments 12 and 13 below table 2 at the front of the apparatus, from which the respective strips are directed past separate number imprinting units 14 and 15, which may be of any conventional construction and of which numerous forms are available upon the market. These numbering units are actuated by suitable connections with the operating parts of the imprinting apparatus.

Beyond the respective numbering units 14 and 15 the record strips pass in superposed relation onto the table 2 of the "Addressograph" machine.

As a convenient and economical method of manifolding the imprinted legend or data, a continuous strip of carbon or transfer material is preferably interfolded with the supply of record material 11, which comprises the slower moving strip and upon which is manifolded the imprinted legend or data.

Obviously, if so desired, one of the numbering units may be so located as to imprint upon the superposed strips and produce its second impression by means of the interposed carbon or transfer material.

In their rearward course, over the top of the table 2, the superposed record strips 10 and 11 pass the imprinting position beneath the presser head 9, and immediately beyond such portion they are simultaneously engaged by separate pin type feeding devices 16 and 17 engageable in marginally punched holes in the record strips and simultaneously actuated through movements of different extent to differentially advance the record strips 10 and 11. The original record strip, which may comprise a succession of checks or other forms, is advanced a full form length at each operation to present the prescribed area of the succeeding form in imprinting position, while the underlying duplicate or master strip is advanced a lesser distance sufficient to receive the manifolded imprints in closely spaced succession.

The feeding units 16 and 17 may be of any suitable type, but for illustrative purposes have been shown as rotary pin wheels having radially disposed pins 18 engageable in marginally punched holes 19 in the record strips 10 and 11. Obviously, other forms of traveling pin type devices serving like purpose may be substituted therefor. The pin wheels 16 and 17 are carried by transverse rotary shafts 20 and 21, supported in a super-structure mounted upon the imprinting apparatus table 2 and comprising opposite end frames 22 and 23 interconnected by sundry tie rods.

Mounted in the super-structure in elevated relation above the respective feeding devices 16 and 17 are elevating devices 25 and 26, one for each strip or set of strips, carried on transverse rotary shafts 27 and 28 journaled in the super-structure end frames 22 and 23, which are differentially actuated in unison with the corresponding strip feeding device. These elevator devices are also preferably, although not necessarily, of the pin type having engagement in the marginal feed holes, but are so adjusted rotatively relative to the feeding devices 16 and 17 that there is a slight degree of slackness in the strips between the feeding and elevator devices and the latter do not exert any pulling or feeding influence other than to lift the imprinted portions of the strips and propel them on their way to separate receivers. The original record strip 10 is received in a compartment or tray 29, supported in elevated relation above the imprinting apparatus table 2 and somewhat below the level of its elevator 25 into which the strip 10 is refolded upon its original fold lines. At the same time, the duplicate strip 11 is directed by its elevator 26 onto an inclined elevated deck 30 beneath the receiving compartment 29, and supported at its rear end substantially coincident with the under side of the receiving compartment 29 and in elevated relation above the table 2 at its forward end by legs 31, beyond which the duplicate strip 11 is refolded on its original fold lines in downwardly and forwardly inclined tray 32 supported on a transverse rod 33 at the front of the imprinting apparatus table 2.

The strip feeding and elevating devices are actuated independently of the imprinting mechanism, but in timed sequence therewith by an electric motor 35, which, operating through a gear head speed reduction mechanism 36, drives a belt 37 operatively engaging with a drive pulley 38 upon a stub shaft 39 journaled in the right-hand frame member 23 of the super-structure.

As shown in Figs. 4, 8 and 17, the pulley shaft at the inner side of the pulley 38 is journaled in a supporting bar 40, the ends of which are fixedly connected with the side frame 23 of the super-structure by a spacer stud 41 and a bracket arm 42. The opposite end of the pulley shaft is journaled in a bearing bushing 43 in a bracket arm 44 extending inwardly and upwardly from the side frame 23. The extremity of the pulley shaft 39 has clutch driving engagement 45 with a stub shaft 46, one end of which is also journaled in the bearing bushing 44. The opposite end of the stub shaft 46 is journaled for independent rotation in a bore in the end of a shaft 47 on which is fixedly mounted a relatively large timing disc 48. See Figs. 8 and 17.

Medially of the stub shaft 46 is a broad faced peripherally notched wheel or disc 49, which rotates in unison with the drive pulley in a plane closely adjacent to the larger timing disc 48, but normally independently thereof.

The pulley 38 and with it the peripherally notched wheel 49 are continuously driven by the motor 35 and are intermittently connected with either one or both sets of pin type strip feeding and elevating devices by single operation coupling means adapted to actuate the driven mechanism through a predetermined range of operation and at the end thereof effect automatic disengagement of the driving means. Pivoted to the face of the larger disc 48 is a spring pressed pawl or dog 50 having a square nose engageable in any one of the several square notches in the periphery of the wheel or smaller disc 49 to operatively connect the larger disc for unison rotation.

In Figs. 12 to 16 there is illustrated timing mechanism to accurately time the engagement and disengagement of the driving and driven mechanism and the duration of the period of operation. To engage and disengage the driving dog 50 with the notched driving wheel or disc 49 at timed intervals, a pair of arms 51 and 52 are freely pivoted on a stud 53 and disposed respectively in the planes of rotation of the larger and smaller discs 48 and 49. Each arm 51 and 52 is provided with a retractile spring 54 connecting studs in the free ends of the respective arms with a stud 55 on the frame 23. The arm 51 carries on its under side a roller 56 which rides on the periphery of the disc 48 during rotation of the latter, and which drops into a peripheral notch 57 in the disc at the limit of each operation. The arm 51 is further provided with a lateral finger or lip 58 which extends beneath the companion pivoted arm 52 and serves to lift the latter arm 52 in unison with elevation of the arm 51. The arm 52 extends rearwardly of its pivotal stud 53 and is connected by a link 59 with the core of a solenoid or armature of an electro-magnet 60 mounted at the rear of the super-structure. This operating link 59 extends through a transverse opening in a boss 61 projecting from the inner side of the frame 23 immediately above the electro-magnet 60 and which supports a guide roller 61' about which the record strip 10 passes in its course from the feed device 16 to the elevator 25.

The driving pawl or dog 50 pivoted to the disc 48 is formed with a shoulder 62 into the path of which the free end of the loosely mounted arm 52 projects when in its depressed position. The engagement of the shoulder 62 with the end of the arm 52 as the driven mechanism approaches the limit of its range of movement, causes the dog to be oscillated out of engagement with the peripherally notched wheel or smaller disc 49 against the yielding resistance of its spring 63, to thereby disengage the driving and driven mechanism.

This engagement of the shoulder 62 with the end of the pivoted arm 52 positively arrests the rotation of the disc 48 and with it the driven mechanism. The disc completes a full rotation at each operation and the mechanism is simultaneously actuated through a complete cycle to advance the original record strip a full predetermined form length, and correspondingly advance the duplicate strip for whatever length the mechanism may be set. However, it is desirable to sometimes issue "split tickets," or forms of fractional length. To do so the arms 51 and 52 are duplicated in reverse relation at 51' and 52' at the lower side of the disc 48 where they operate in like manner to arrest the operation when the disc has made but a half rotation, by engagement of the roller 56' in the notch 57 when the latter is in the lowermost position. The arms 51 and 51' are interconnected by a link 59' for unison operation under influence of the link 59 and electro-magnet 60 to initiate the cycle of operation, whether of full or half rotation of the disc 49. When full form feeding is desired and complete rotation of the disc 48 effected, the supplemental arms 51' and 52' are locked out of operative relation by a cam lever 60a. This is permitted by a slotted connection 60b of the link 59'.

To release the driving dog or pawl for reengagement with the notched driving wheel or disc 49, an electric circuit is closed through the solenoid or electric magnet 60 in timed relation with the operation of the imprinting apparatus. In the conventional Addressograph construction, in association with which the present invention is illustrated, the swinging presser head 9 is provided with small rollers 9a to which is imparted a to and fro motion while the presser head is in depressed position. This motion is transmitted to the rollers by a curved bar 64 in Figs. 20 and 21, located closely adjacent to the oscillatory presser head 9 and having differential motion incident to the swinging motion thereof. This differential motion of the bar 64 incident to actuation of the presser head during the imprinting operation of the Addressograph is utilized to trip successively electric switches controlling the electro-magnet circuit and also that actuating the numbering devices.

A stud 65 is mounted on the roller operating bar 64 of the presser head and incident to the operative movement of the head such pin describes a circuitous path of travel indicated by dash lines and arrows in Fig. 4 and Fig. 20. While the stud 65 may be mounted directly on the bar 64, since the present apparatus is applicable to existing Addressograph machines, the stud 65 is preferably carried by a U shaped clamp 65' which straddles the bar 64 and is releasably secured thereto.

Mounted on the end frame 23 are two lever operated electric switches 66 and 67 (see Figs. 4, 5 and 11), having oscillatory operating levers 68 and 69 which extend into the path of travel of the tripping pin or stud 65 carried by the roller actuating bar 64 of the presser head 9.

The electric switch 66 controls the operation of the numbering devices 14 and 15, with which it is connected through the cable 69'. These numbering devices, as well as the electrical switches, may be of any suitable or conventional construction, of which there are several different commercial forms available. The numbering devices embody electrically energized operating means (not shown) which upon closing of the electrical circuit by oscillation of the switch arm 68 incident to engagement therewith of the stud 65 effects consecutive numerical imprinting of the respective record strips. After operating the numbering control switch, the stud 65 by its continued travel engages and operates in sequence the lever 69 of the electro-magnet control switch 67 to close the circuit through the magnet 60. The energization of the electromagnet and resulting attraction of its armature acting through the link 59 oscillates the pivoted arm 51, raising the front end thereof and lifting the roller 56 out of the notch 57 in the periphery of the disc 48. The same movement of the arm 51 effects elevation of the companion arm 52 out of engagement with the shoulder 62 of the driving dog 50 by the lifting engagement of the lateral finger or lip 58 thereneath such lever 52.

The driving dog 50 upon release by disengagement of the end of the arm 52 from the shoulder 62 permits the dog 50 to engage the notched wheel 49 under influence of its actuating spring. In event the supplemental "split ticket" or fractional form control levers 51' and 52' are released from their locking device, they are actuated in unison with the levers 51 and 52. So long as the rollers 56 and 56' ride upon the periphery of the rotating disc 48, thereby holding the arm 51 elevated and arm 51' depressed, the companion arms 52 and 52' will also be held out of the path of the shoulder 62 of the dog 50. When the disc has completed a prescribed degree of rotation, either full rotation or a predetermined partial rotation, the descent of the roller 56 or 56' into the peripheral notch 57 under influence of the retracting spring 54 again presents the end of the arresting arm in the path of the shoulder 62 of the dog and the latter is again disengaged. The disc 48 is thus actuated through a full rotation, a half rotation or other partial rotation, according to the length of "split forms" to be fed, and is positively arrested at the end of each operative cycle.

The accurately measured rotation of the driven disc 48 in synchronism with the operation of the imprinting apparatus is transmitted through suitable gear trains to one or both pin type strip feeding and elevating devices, one of which may be connected and disconnected at the will of the operator. The transmission mechanism is best illustrated in Figs. 5 to 11 inclusive.

The side frame 23 of the super-structure is formed with an integral gear housing at its outer side, which is divided by a vertical wall 70 (Figs. 8, 9, 10 and 11) into outer and inner compartments 71 and 72, the latter having an upward continuation 73 extending above the level of the compartment 71. The division wall 70 provides a series of bearings for various operating parts of the transmission mechanism. Fixedly secured to a reduced portion of the shaft 47 of the disc 48, which extends through the frame member 23 into the gear compartment 72, is a spur gear 74 by which motion is transmitted to one set of feeding and elevating devices. Detachably engageable with the reduced extremity of the shaft 47 by a shiftable clutch 75 is an axially aligned continuation 76 of the shaft 47 driving a gear train transmitting motion to the second set of feeding and elevating devices in timed sequence with operation of the printing mechanism and primary feeding means, when operatively connected with the driving means by adjustment of the clutch 75.

Referring particularly to Figs. 7 and 10, the gear 74, which rotates in unison with the rotary disc 48, intermeshes with a gear 77 journaled on a stud in the upper extension 73 of the gear compartment 72. Detachably connected with the gear 77 for unison rotation is a gear pinion 78 which is interchangeable with other gear pinions of different size for varying the speed and range of operation of the driven mechanism. This interchangeable gear pinion 78 is retained in driving engagement with the larger gear 77 by a slotted collar 89 having straddle engagement in a peripheral groove in the pinion shaft.

Intermeshing with the gear pinion 78 is an idler pinion 81 carried by an oscillatory arm 82 pivoted concentrically with a driven gear 83 with which the idler pinion 81 intermeshes. The swinging adjustment of the carrier arm accommodates the idler pinion to interchangeable pinions 78 of different size. The carrier arm is releasably held in its adjusted position by a clamp bolt 84 engaging through an arcuate slot 85 in the head of the carrier arm.

The driven gear 83 is mounted on the extremity of the upper elevator shaft 27 which carries the upper pin type elevator 25 for feeding the original or form strip 10 into the receiving tray 29. The gear 83 is adjustably engaged by a "variable" 86 of conventional construction, such as customarily embodied in typewriters for rotatively adjusting the platen roll thereof relative to the line spacing mechanism.

This "variable" comprises a simple form of spring actuated clutch on the end of the shaft, which upon axial retraction by a knob 86' may be reengaged in different rotative relation of the shaft and gear. The elevator shaft 27 being driven by the described gear train transmits unison rotation to the shaft 20 of the pin type feeding devices 16 through a substantially vertical shaft 87 mounted in suitable brackets 88 on the outer side of the opposite frame member 22 of the super-structure, as shown particularly in Fig. 3. The transmission shaft 87 carries at each end bevel pinions 89 intermeshing with corresponding pinions 90 upon the respective shafts 20 and 27, which are thus intermittently actuated in unison through measured range of operation.

The second set of feeding and elevator devices are actuated simultaneously but ordinarily through a different range of movement from the same initial shaft 49 on which is mounted the timing disc 48. The second train of transmission mechanism is illustrated in Figs. 5, 6, 7, 8, 9 and 11. The axially aligned continuation 76 of the shaft 47 is releasably connected therewith by a clutch 75 within the gear housing compartment 72. As shown in Fig. 8 and in enlarged detail in Fig. 13, the shaft continuation 76 is provided with an enlarged counterbored head 91 into which the reduced extremity of the primary shaft 47 projects. This head is longitudinally slotted at one side as is also the reduced extremity of the shaft 47. A peripherally grooved clutch collar 75 slidingly mounted upon the shaft head 91 carries an inwardly projecting stud 92 engaging in the registering slots to couple the shafts 47 and 76 for unison rotation. The clutch collar 75 is shifted from the solid line to the dotted line position of Fig. 18 by a yoke 93 having an operating handle 94 extending exteriorly of the gear housing, and upon moving the engaging stud 92 beyond the end of the primary shaft 47, the shafts 47 and 76 are disengaged, whereby only the primary set of feeding and elevating devices will be actuated as heretofore described.

Referring particularly to Fig. 8, the shaft extension 76 is journaled in a hub 95 projecting from the division wall 70 of the gear housing and carries at its extremity within the gear compartment 71 a large gear wheel 96 which meshes with a smaller gear pinion 97 upon the end of a crank shaft 98 journaled in a bearing hub 99 also projecting from the gear housing division wall 70. (See Fig. 5.) The opposite end of the shaft 98 carries within the gear compart 72 a crank arm 100 having a wrist pin 101 slidingly engaging in a slot 102 in a rocker arm 103 carried by a rock shaft 104. (Figs 6, 7 and 8.) The rock shaft 104 is journaled in a bearing hub 105 projecting from the gear housing division wall 70. The crank shaft 98 and crank 100 make complete rotations, while the rocker arm 103 actuated thereby, being of greater radius, is moved to and fro through a limited oscillatory motion which is transmitted to the rock shaft 104.

The outer end of the rock shaft 104 carries within the gear compartment 71 a small gear pinion 105' and closely adjacent thereto a gear segment 106 of greater radius. (Figs. 5, 8, 9 and 11.) These gear elements are connected to each other and to the shaft for unison oscillation. It is to be noted that, contrary to the appearance in Fig. 5, the gear pinion 105' does not mesh with the gear pinion 97 but is offset inwardly of the plane of the gears 96 and 97 as shown in Fig. 8.

The oscillatory gear elements 105' and 106 intermesh respectively with companion gear segments 107 and 108 of different radii, which are mounted concentrically with each other in a bearing hub 109 projecting from the gear housing division wall 70 and about a rotary shaft 110. (See Fig. 9.) The gear sectors 107 and 108 are free for relative oscillatory motion independently of each other and independently of the intermittently actuated shaft 110. Fixedly secured upon the outer end of the shaft 110 within the gear compartment 71 is a ratchet wheel 111 having in its periphery a succession of ratchet teeth and a succeeding segmental portion 112 which is devoid of teeth. The ratchet wheel 111 has in its hub 113 two ratchet teeth 114, disposed in approximately the same radial relation as the smooth or untoothed segmental portion 112 of the ratchet wheel 111.

The purpose of this is to provide for a differential feeding movement of the apparatus by which a succession of relatively short advance steps of the strip being fed will be followed by a longer advancement thereof. The duplicate or detail record strip 11 is divisible at spaced intervals upon transverse weakened lines into a succession of separate sheets. In imprinting the duplicate record a succession of imprinted legends is effected at uniform line space intervals until the end of one of the sheet sections defined by a transverse weakened line is reached. Thereupon the strip is advanced an increased distance at a single operation to accommodate a heading space upon the succeeding sheet section and present the first imprint receiving position of such sheet in exact registry with the imprinting devices.

To effect the successive line space feeding movements, the gear segment 107 (front of 108) carries an outward projecting stud 114' upon which is pivoted a spring actuated pawl 115 having operative engagement with the teeth of the ratchet wheel 111. The rocking motion of the shaft 104 transmitted to the intermeshing gear segments 106 and 108 alternates the movement of the pawl 115 and thus advances the ratchet wheel and with it the shaft 110 through successive relatively short partial rotations of equal extent. During this period the intermeshing gear elements 106 and 108 also possess to and fro oscillatory motion in unison with the members 105 and 107. Being of different proportions, the resulting transmitted motion is of different degree or extent.

Carried by the gear segment 108 is a spring actuated pawl 116 which rides idly upon the untoothed portion of the hub 113 during the step by step or line spacing movement of the ratchet wheel 111 under influence of the pawl 115. However, when the pawl 115 reaches the limit of the series of ratchet teeth in the wheel 111, the teeth 114 in the hub 113 will have been moved into the range of action of the pawl 116, which by the oscillation of the intermeshing segments 106 and 108 is caused to engage the tooth 114 and move the ratchet wheel and with it the shaft 110 a longer advance step. This advancement effected by engagement of the pawl 116 upon the segment 108 with the tooth 114 in the hub 113 of the ratchet wheel 111 is sufficient to advance the duplicate record strip 11 from the last imprint line of one detachable sheet section to the first imprint line of the succeeding sheet section, passing over the heading space of such second sheet section, all in one continuous movement. It also advances the ratchet wheel 111 sufficiently to carry the untoothed segment 112 beyond the pawl 115 which thereupon again engages its ratchet teeth. Thus, there are two degrees of successive partial rotation transmitted to the shaft 110, including a succession of short equal line spacing movements incident to the action of the pawl 115 upon the ratchet wheel 111 followed by a longer movement at the completion of a predetermined number of short steps, by the action of the pawl 116 upon the hub tooth 114 of the ratchet wheel.

At its inner end the shaft 110 carries within the compartment 72 a ratchet wheel 117, with which a spring actuated detent pawl 118 engages to retain the wheel and shaft in their advanced position of rotation and prevent back lash. This ratchet couple shown in Fig. 6 is merely retaining means. However, secured to the inner end of the shaft 110 adjacent to the ratchet wheel 117 is a gear wheel 119 which intermeshes with a small gear pinion 120 upon the elevator shaft 28 which carries the pin type elevator device 26 having engagement in the marginal holes of the duplicate strip 11 and by which it is advanced over the deck 30.

Like the shafts 28 and 21, the shaft 27 is operatively connected with the feed device shaft 20 as shown in Fig. 3 by a substantially vertical shaft 121 mounted in brackets 122 on the end frame 22 and having at each end bevel gears 123 meshing with like gears 124 on the respective shafts 21 and 28. Unison timed movements of measured extent are transmitted by the mechanism described simultaneously to feeding and strip elevating devices 16 and 25. While any suitable feeding means may be employed for strip feeding and elevating purposes, including cooperating frictional rollers such as have been commonly used in the typewriter, autographic register and tabulating machine arts, the feeding and elevating devices as before mentioned are preferably, although not necessarily, pin type feeding devices progressively engageable in successions of marginally punched holes in the record strips or engageable in more widely separated longitudinally spaced holes medially of strips. Such pin type feeding means may comprise pin wheels having relatively fixed feeding pins, traveling endless studded belts of reciprocatory pin feeders, of which there are numerous prior art examples. However, the pin type feeding units shown in the drawings are of the reciprocatory pin style which forms the subject matter of Letters Patent No. 2,000,649 and No. 2,000,651, of May 5, 1935, to which reference is made, the specific construction and operation of which forming no part per se of the present invention and is not here described. Inasmuch as the record strips engage the feeding and elevating units 16, 17, 25 and 26 through only a relatively small segmental area, retractable feeding pins are not essential and other forms of pin feed units may be employed.

The feeding and elevating units are mounted in spaced relation upon their respective shafts 20, 21, 27 and 28 to agree with the widths of the respective strips 10 and 11 of record material, which may be of the same or different widths. Intermediate the feeding and elevating units, there are disposed in spaced relation upon the respective shafts series of spaced discs 16', 17', 25' and 26', which support the medial areas of the strips. Each strip is divisible at longitudinally spaced intervals upon transverse weakened lines into a series of independent sheets or forms. While the spacing of the division lines of each strip is uniform, the spacing of the weakened division lines of one strip may vary from that of the other strip. For example, the original strip 10 may comprise a succession of checks or vouchers upon each of which is to be imprinted the name, address and account data of the recipient, necessitating that the strip 10 be advanced a full form or voucher length at each operation. The accompanying duplicate or detail record sheet may comprise a succession of separable forms or sheets of much greater length than the check or voucher lengths of the original strip 10. However, instead of receiving one imprint on each succeeding form or sheet, a succession of closely spaced imprints of the data imprinted on a considerable number of checks, vouchers, or other original strip forms are impressed upon the same sheet or form of the duplicate strip 11. When the duplicate record sheet or form is filled by such closely spaced imprints, the spacing of which is determined by the line spacing ratchet wheel 111 and pawl 115, it becomes necessary to impart to the strip a longer advance movement which will carry the filled sheet beyond the imprinting position and present the initial imprint receiving area of the succeeding sheet or form in accurate registry with the imprinting means, which area may be spaced a considerable distance from the transverse division line between the forms or sheets. This form space advance is effected by the engagement of the pawl 116 with the tooth 114 of the ratchet wheel hub 113.

This is first a differential travel motion between the respective strips 10 and 11, wherein strip 10 is advanced a form length at each operation while the duplicate strip is being advanced only a line space, and second, there is a differential in the successive advancements of the duplicate strip 11, wherein it is uniformly advanced through a predetermined number of relatively short line spaces followed by a final longer advance step at the completion of the cycle whereby one form is withdrawn and a succeeding form is positioned in imprinting position. Moreover, these differential movements of the strips relative to each other and those of succeeding portions of the same strip are effected in accurately timed relation with the operation of the imprinting apparatus, and the particular legend to be imprinted is determined by a prepared legend determining element which is one of a supply which are positioned seriatim in operative relation with the imprinting apparatus.

While in the particular apparatus illustrated, which is that of an Addressograph machine, the legend determining elements are the especially embossed or printing plates or stencils, the invention is not limited thereto but in appropriate form may be applied to tabulating machines and the like wherein the legend to be imprinted is determined by punched cards which are successively presented in control relation with the imprinting apparatus. The present strip feeding apparatus is further applicable to other writing and imprinting mechanisms, such as check writers, flat-bed typewriters and analogous mechanisms which are not necessarily dependent on preformed legend determining elements.

In operation, the respective driving motors of the imprinting apparatus and the strip feeding mechanism being set in operation, the strips 10 and 11 are progressively automatically withdrawn from the supply 12 and 13 and advanced past the numbering devices 14 and 15 which are tripped by the oscillation of the switch arm 68 of the control switch 67 by engagement therewith of the stud 65 as the presser head descends to imprint a previously numbered form which has been advanced past the numbering position into the printing position by preceding operations. The continued movement of the presser head causes the stud 65 to then engage the switch arm 69 of the switch 66 by which the electro-magnet 60 is energized to trip the strip feeding mechanism for a single predetermined cycle of operation, at the end of which the driving and driven mechanism of the strip feeding apparatus is automatically disconnected. The arrangement is such that the strip feeding mechanism is energized only when the imprinting apparatus has been operated and in timed relation therewith after the imprinting has been effected and as the presser head returns. The imprinting apparatus is so automatically controlled that in Addressograph machines, tabulators and other automatic mechanisms controlled by a preformed legend determining element, the actuation of the imprinting mechanism does not occur until the legend determining punched card, printing plate, stencil, or like element has been shifted from the supply thereof into control relation.

Thus, the feeding operation is directly dependent upon the imprinting operation and the latter is dependent upon presentation of the legend determining element in proper position. If no legend determining member is supplied, there can be no imprinting, and without the imprinting operation no feeding movement occurs. Thus, these successive operations are mutually interdependent upon each other. The strips 10 and 11 being advanced past the imprinting position in superposed relation with a portion of carbon or transfer material interleaved therebetween are separately engaged, each by its own feeding device. The overlying duplicate record strip 11 is engaged by the feeding unit 17, while the original record strip 10 is engaged by the feeding unit 16 positioned in the rear of the unit 17 and on level therewith. These units are substantially tangential to the path of travel of the strips past the imprinting position.

The original record strip 10 passes from the feeding unit 16 upwardly about a freely rotating guide roller 61' through an opening in the trunnion boss 61, of which the link 59 of the magnetically operated tripping device extends. The original record strip passes thence over the elevator unit 25, which is substantially identical with the feeding units 16 and 17, and into the receiving compartment or tray 29. The strip having been sharply folded in zigzag form in the supply packet automatically reassumes such folded form as it enters the receiving tray.

At the same time, the duplicate record strip 11, being advanced past the imprinting position by the feeding units 17, is directed upwardly about an idler guide roller 17' to the elevator units 26, by which the strip 11 and accompanying carbon strip are discharged onto the deck 30. The record strip passing beyond the deck 30 is received in the tray 32 at the front of the machine, where it also reassumes its original fold lines. The carbon strip may be refolded with the strip 11, but is preferably diverted into a separate waste receptacle as the strips leave the deck 30.

As before described, the feeding movement of strips and the operation of the numbering device are electrically controlled by the movement of the presser head 9 to effect an imprint impression on the positioned strips. The electrical control system is diagrammatically illustrated in Fig. 25. As there illustrated, the electrical service or power lines 135 communicate with a switch block 136 located on the back of the machine as shown in Figs. 3, 4, 5 and 10. Included in this switch unit are several manually operated switches, one of which (137) controls the motor cable 138 supplying energizing current to the actuating motor 35 which drives the strip feeding apparatus independently of the imprinting mechanism.

A second manual switch 139 of the same unit 136 is connected in series with the automatically operated switch 66 in the circuit 69' by which the numbering units are actuated. The numbering devices 14 and 15 are preferably commercial electrically operated units, which embody electromagnetic means or a solenoid body through which the circuit is intermittently closed in timed sequence by the closing of the switch 66. This switch, together with the companion switch 67 controlling the mechanism tripping solenoid 60, is tripped in proper sequence by the engagement of the stud 65 carried by the lever 64 on the printing head 9 (Figs. 20 and 21) with the oscillatory trip levers 68 and 69, pertaining respectively to the switches 67 and 66 as shown in Fig. 4. The automatic switch 67 is in series with a manual switch 140 of the switch unit 136 and serves to intermittently energize the feed mechanism tripping magnet or solenoid 60. The solenoid 60, as before described, is connected through the link 59 with the trip lever 52 (Figs. 12 to 16), the oscillation of which permits the driver dog 50 to fall into clutch engagement with the notched disc 49 to enable the constantly running motor 35 to actuate the strip feeding mechanism through one complete cycle at the end of which the clutch dog is automatically withdrawn.

To prevent sparking, condensers 141 are bridged across the automatic switches 66 and 67. To protect the numbering units 14 and 15 against damage, thermal overload circuit breakers 142 are interposed in the electrical energizing circuits thereto. Furthermore, to enable the operation of either of the numbering devices without the other, additional manually operated switches 143 are provided in each of the numbering unit circuits.

Interposed in the circuit 69' in series with the switch 66 is an additional "listing" make and break switch 143. This is adapted to be actuated by a contact roller 144 on an arm 145 carried by the rotating shaft 110. The shaft 110 rotates once for each succeeding form to be imprinted.

A screw 146 on the listing switch 143 may be adjusted at will to hold the switch closed independently of its actuation by the arm 145. If it is desired to imprint on every line or at every succeeding impression regardless of how many impressions may be made within a given length of strip or on a single successive form, then the switch 143 is permanently closed by adjustment of the screw 146. Thereupon the switch 66, which is actuated at every movement of the printing head, by engagement of the stud 65 with the trip lever 69, correspondingly actuates the numbering device 14 or 15, or both, repeatedly. However, if but one numbering operation is effected for each form or given length of strip, then the screw 146, being relieved, allows the switch 143 to open. Thereafter, it is closed intermittently by the rotating arm 145 by the shaft 110 which at intervals occurs simultaneously with the closing of the switch 66 by the stud 65, but not every time the switch 66 is closed. So long as the switch 143 is operative and stands open, the switch 66 may be repeatedly closed idly with each impression without operating the numbering device. However, when the arm 145 closes the switch 143 simultaneously with the closing of the switch 66 by the imprinting head, the numbering device will be operated. For example, in a particular installation the continuous series connected record forms are adapted to receive twenty successive line spaced impressions. If it is desired to number each line impression, the screw 146 being tightened to permanently close the switch 143, the switch 66 operates every time an impression is made to energize the numbering device. However, with the screw 146 relieved, the switch 143 is operated by the arm 145 only each twentieth time, i. e., but once for each form length.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A strip feeding and imprinting apparatus, wherein a continuous strip of record material is intermittently advanced past an imprinting position at which it receives at longitudinally spaced intervals imprinted indicia predetermined by legend determining means progressively presented in imprint control relation and wherein the imprinting operation is dependent upon the presentation of the legend determining means and the feeding operation is dependent upon the imprinting operation, characterized by strip feeding means for advancing the record strip relative to the imprinting position a measured distance at each operation, elevator means operated in synchronism with the feeding means for carrying the imprinted strip upwardly imprinting means and an operative connection between the imprinting means and the strip feeding means, by which the latter is actuated in timed relation with the former.

2. In an imprinting apparatus wherein a continuous strip of record material receives a succession of imprinted legends at differently spaced intervals, imprinting means past which the strip is intermittently advanced through successive step-by-step movements, actuating means therefor, separate electrically actuated feeding means for advancing the strip through a step-by-step movement, an electrical control circuit therefor, and a circuit closer device actuated by the imprinting means for closing the circuit to energize the strip feeding means in timed sequence with the printing means.

3. In an imprinting apparatus wherein a continuous strip of record material receives a succession of imprinted legends at longitudinally spaced intervals, imprinting means past which the strip is intermittently advanced through successive step-by-step movements, actuating means therefor, an intermittently operative strip feeding means for advancing the strip past imprinting position, trip means for initiating the operation of the strip feeding means, electromagnetic means for actuating the strip feeding trip, an energizing electrical circuit therefor, and circuit closer means actuated by the printing means for closing the circuit to effect operation of the feeding means in timed sequence with the operation of the printing means.

4. In an imprinting apparatus wherein a continuous strip of record material receives a succession of imprinted legends at longitudinally spaced intervals, imprinting means past which the strip is intermittently advanced through successive step-by-step movements, actuating means therefor, an intermittently operative strip feeding means for advancing the strip past imprinting position, a constantly operating driving means therefor, clutch means intermittently connecting the driving means and strip feeding means, and electrically operated control means for the clutch including an energizing electrical circuit intermittently closed by the operation of the imprinting means for actuating the clutch means in timed sequence with the imprinting means.

5. In an imprinting apparatus wherein a continuous strip of record material receives a succession of longitudinally spaced legends, imprinting means past which the strip is intermittently advanced through successive step-by-step movements, an intermittently operative strip feeding means for advancing the strip past the imprinting means, separate actuating means for the imprinting and strip feeding means, and electrically operated control means, including an electrical energizing circuit closed by the operation of one of said means for actuating the other said means in timed sequence therewith.

6. In an apparatus wherein a continuous strip of record material receives successive imprinted legends at longitudinally spaced intervals, plural alternately operable printing devices past which the strip is advanced through step-by-step movement, intermittently operable strip feeding means for advancing the strip past the imprinting devices, and means controlled by the operation of one imprinting device for advancing the strip preparatory to being imprinted by the other imprinting device.

7. In an apparatus wherein a continuous strip of record material receives successive imprinted legends at longitudinally spaced intervals, dual imprinting means for separately imprinting the strip, past which the strip is advanced through a step-by-step movement, intermittently operable strip feeding means for advancing the strip past the imprinting devices, and optionally selective means for effecting synchronous operation of the imprinting devices through cycles of one imprint operation of each imprinting device for each imprinting operation of the other imprinting device, and through alternate cycles of one imprinting operation of the imprinting device for each group of plural imprinting operations of the other imprinting device.

8. In an apparatus wherein a continuous strip of record material receives successive imprinted legends at longitudinally spaced intervals, dual imprinting means for separately imprinting the strip, past which the strip is advanced through a step-by-step movement, intermittently operable strip feeding means for advancing the strip past the imprinting devices, and control means for effecting a succession of imprinting operations by one such imprinting device within a prescribed length of record strip and for effecting a single impression by the other such imprinting device within the same length of record strip.

9. In an apparatus for imprinting legends upon a continuous strip of record material at longitudinally spaced intervals, plural imprinting devices for separately imprinting the record strip, feeding means common thereto for intermittently advancing the strip past the imprinting devices through a step-by-step movement, dual control means for one of the imprinting devices by one of which it is actuated in timed sequence with the operation of the other imprinting device and by the other of which it is actuated in timed sequence with the strip feeding operations.

10. In an apparatus for imprinting legends upon a continuous strip of record material at longitudinally spaced intervals, plural imprinting devices for separately imprinting the record strip, feeding means common thereto for intermittently advancing the strip past the imprinting devices through a step-by-step movement, electrically operated means for effecting operation of the other imprinting device, optionally controlled by either the first imprinting device or by the strip feeding means.

JOHN Q. SHERMAN.
ALBERT W. METZNER.